United States Patent
Adjaoute

(10) Patent No.: US 11,481,777 B2
(45) Date of Patent: Oct. 25, 2022

(54) FAST ACCESS VECTORS IN REAL-TIME BEHAVIORAL PROFILING IN FRAUDULENT FINANCIAL TRANSACTIONS

(71) Applicant: Brighterion, Inc., Purchase, NY (US)

(72) Inventor: Akli Adjaoute, Mill Valley, CA (US)

(73) Assignee: Brighterion, Inc., Purchase, NY (US)

( * ) Notice: Subject to any disclaimer, the term of this patent is extended or adjusted under 35 U.S.C. 154(b) by 12 days.

(21) Appl. No.: 17/245,116

(22) Filed: Apr. 30, 2021

(65) Prior Publication Data

US 2021/0248614 A1 Aug. 12, 2021

Related U.S. Application Data

(63) Continuation of application No. 16/184,894, filed on Nov. 8, 2018, now Pat. No. 11,023,894, which is a continuation of application No. 14/520,361, filed on Oct. 22, 2014, now abandoned, which is a continuation-in-part of application No. 14/514,381, filed on Oct. 15, 2014, now abandoned, which is a continuation-in-part of application No. 14/454,749, filed on Aug. 8, 2014, now Pat. No. 9,779,407.

(51) Int. Cl.
*G06Q 20/40* (2012.01)
*H04L 67/306* (2022.01)
*H04L 67/50* (2022.01)

(52) U.S. Cl.
CPC ........ *G06Q 20/4016* (2013.01); *H04L 67/306* (2013.01); *H04L 67/535* (2022.05)

(58) Field of Classification Search
None
See application file for complete search history.

(56) References Cited

U.S. PATENT DOCUMENTS 7,159,208 B2  1/2007 Keeley
7,403,922 B1  7/2008 Lewis et al.
(Continued)

OTHER PUBLICATIONS

Office Action from U.S. Appl. No. 16/168,566 (dated Jul. 21, 2021).
(Continued)

*Primary Examiner* — Joseph W. King
(74) *Attorney, Agent, or Firm* — Hovey Williams LLP

(57) ABSTRACT

A computer-implemented method for real-time transaction fraud vetting, including: receiving a transaction record including real-time transaction data and a key identifying a transacting entity; matching the key to a plurality of profiles of the transacting entity, each of the plurality of profiles including a data attribute; accessing a datapoint for each of the plurality of profiles, each datapoint representing a standard for the corresponding data attribute computed from historical transaction records of the transacting entity; assessing whether deviation of the real-time transaction data from each datapoint exceeds a corresponding threshold; incrementing a transaction risk corresponding to the transaction record for each deviation from one of the datapoints that exceeds the corresponding threshold; outputting a fraud score based at least in part on the transaction risk; and updating at least one datapoint based on the corresponding real-time transaction data to generate an updated datapoint set for the plurality of profiles.

20 Claims, 11 Drawing Sheets

(56) References Cited

U.S. PATENT DOCUMENTS

| | | | |
|---|---|---|---|
| 7,590,970 | B2 | 9/2009 | Bromley |
| 7,630,956 | B2 | 12/2009 | Wyatt et al. |
| 7,685,083 | B2 | 3/2010 | Fairweather |
| 7,877,421 | B2 | 1/2011 | Berger et al. |
| 8,401,990 | B2 | 3/2013 | Silsby |
| 9,069,737 | B1 | 6/2015 | Kimotho et al. |
| 9,996,694 | B2 | 6/2018 | Sethumadhavan et al. |
| 10,817,530 | B2 | 10/2020 | Siebel et al. |
| 2002/0147754 | A1 | 10/2002 | Dempsey et al. |
| 2006/0171509 | A1 | 8/2006 | Berthaud et al. |
| 2007/0239936 | A1 | 10/2007 | Gluhovsky |
| 2012/0323661 | A1* | 12/2012 | Otto ............... G06N 5/025 705/14.25 |
| 2017/0006135 | A1 | 1/2017 | Siebel et al. |
| 2017/0289176 | A1 | 10/2017 | Chen et al. |
| 2018/0032723 | A1 | 2/2018 | Danger et al. |
| 2019/0007517 | A1 | 1/2019 | Jagannath et al. |

OTHER PUBLICATIONS

Office Action from U.S. Appl. No. 16/264,144 (dated Sep. 22, 2021).
Office Action from U.S. Appl. No. 16/424,187 (dated Sep. 1, 2021).
Office Action from U.S. Appl. No. 16/663,452 (dated Aug. 17, 2021).
Office Action from U.S. Appl. No. 16/743,009 (dated Sep. 10, 2021).
Office Action From U.S. Appl. No. 16/424,187 (dated Dec. 9, 2021).
Office Action From U.S. Appl. No. 16/743,009 (dated Jan. 28, 2022).
Office Action from U.S. Appl. No. 16/424,187 (dated Feb. 26, 2021).
Office Action from U.S. Appl. No. 16/226,246 (dated Dec. 15, 2020).
Ex Parte Quayle Action from U.S. Appl. No. 16/369,626 (dated Jan. 7, 2021).
Office Action from U.S. Appl. No. 16/168,566 (dated Mar. 23, 2021).
Office Action from U.S. Appl. No. 16/226,246 (dated Apr. 26, 2021).
Office Action from U.S. Appl. No. 16/264,144 (dated Apr. 23, 2021).
Office Action from U.S. Appl. No. 16/663,452 (dated Mar. 12, 2021).
Office Action from U.S. Appl. No. 16/743,009 (dated Mar. 24, 2021).
Office Action From U.S. Appl. No. 16/424,187 (dated Apr. 26, 2022).
Office Action From U.S. Appl. No. 16/264,144 (dated Apr. 13, 2022).

* cited by examiner

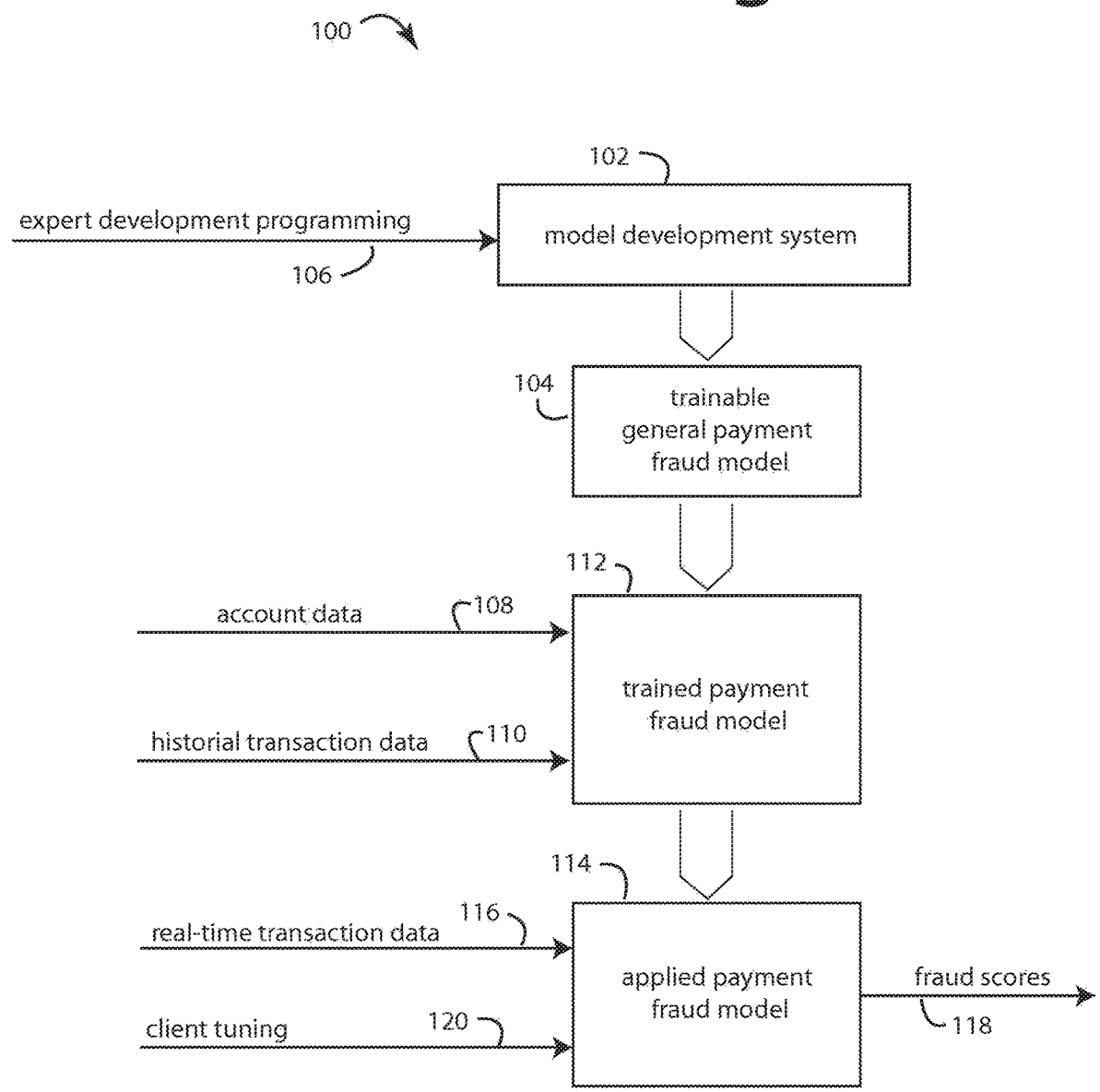

FAST ACCESS VECTORS IN REAL-TIME BEHAVIORAL PROFILING IN FRAUDULENT FINANCIAL TRANSACTIONS

RELATED APPLICATIONS

The current application is a continuation patent application which claims priority benefit with regard to all common subject matter to identically-titled U.S. patent application Ser. No. 16/184,894, filed on Nov. 8, 2018, which, itself, is a continuation of and claims priority benefit with regard to all common subject matter to U.S. patent application Ser. No. 14/520,361, filed Oct. 22, 2014, which, itself, is a continuation-in-part application of and claims priority benefit with regard to all common subject matter to U.S. patent application Ser. No. 14/514,381, filed Oct. 15, 2014, and entitled ARTIFICIAL INTELLIGENCE FRAUD MANAGEMENT SOLUTION, which, itself, is a continuation-in-part application of and claims priority benefit with regard to all common subject matter to U.S. patent application Ser. No. 14/454,749, filed Aug. 8, 2014, entitled HEALTHCARE FRAUD PREEMPTION, and now issued as U.S. Pat. No. 9,779,407. The listed earlier-filed non-provisional applications are hereby incorporated by reference in their entireties into the current patent application.

BACKGROUND OF THE INVENTION

Field of the Invention

The present invention relates to real-time financial fraud management systems, and more particularly to fast access file systems for smart agent profiles that track transaction behaviors.

Background

Financial institutions are ever-increasingly challenged by constantly evolving forms of fraud that are arriving on more fronts than ever. Criminals are continually dreaming up new ways to stay one step ahead of law enforcement. Financial institutions must simultaneously protect their customers from fraud, protect themselves from fraud losses, and comply with increasingly complex and difficult regulations and mandates.

Everyone is facing significantly more pressure in authenticating consumers in non-face-to-face channels to protect their brand from vulnerabilities and financial losses from fraud. Accurate fraud detection processes are getting more important than ever as mobile and online channels are used more widely by customers. At the same time, fraudsters' techniques are becoming increasingly sophisticated and they have begun using sensitive information and access in one channel to perpetrate frauds in the other channels.

Americans have many different types of on-line accessible accounts and routinely access many different payment products. One such account can be used to move funds to another, and then the second is used to move the funds away. For example, a bad check can be deposited to a checking account, and that one used to pay down a credit card balance, which is then run up to the account limits right away.

Few financial institutions are equipped to detect cross-channel fraud, because they simply manage fraud by payment channel, rather than at the customer level. That will not stop fraudsters who compromise one channel, and then complete a bigger fraud on another. Fraud must therefore be tracked from the perspective of the customer being the independent variable.

Whenever there is a risky transaction in one customer relationship, then all the others need to be looked at. Total customer risk involves looking at all of the products a particular customer has with a financial institution. (Better yet, with all independent institutions.) Understanding customers' relationships allows the real risk to be understood and quickly controlled. A customer who overdrafts and has large assets elsewhere presents a different risk than another who overdrafts and also has a past-due on a line-of-credit. Cross-channel fraud detection becomes possible if data is organized by customer.

Conventional fraud prevention solutions dedicate a stand-alone system for each of several different channels in a so-called silo-approach. But the silo-approach represents a wasteful duplication of resources, product specialists, operational costs, and investment costs. Silos can limit automated, cohesive sharing of information across channels, and thus can hinder advisory alerts and automated stop payments.

Attempts at fraudulent transactions come from all channels, and are generated by external people and are often mistakenly interpreted as the customer themselves. Fraudulent transaction attempts made by company personnel can include changing customer information, faking contact information, and faking transactions to look as if the customer made them.

Enterprises need to monitor their operations, to both prevent fraud and protect their image. Operational mistakes can be monitored to catch getting higher or lower commissions, fees or making stock purchase orders for more than one day at open market prices, selling foreign currency at a higher rate, etc.

SUMMARY OF THE INVENTION

Briefly, an artificial intelligence fraud management system of the present invention comprises a real-time analytics process for analyzing the behavior of a user from the transaction events they generate over a network. An initial population of smart agent profiles is stored in a computer file system and more smart agent profiles are added as required as transaction data is input. Vectors are assigned to point to a run of profile data that all share the same atomic time interval. The vectors are rolled around to point to newer time intervals as they occur, retiring vectors to expired time intervals, and reassigning those vectors to point to the newer atomic time intervals. Vectors correspond to particular smart agent profiles (P) and are collected into lists stored in profile blocks with a meta-data header. Transactions that involve a particular entity are made quickly accessible and retrievable by such vectors.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 1 is a functional block diagram of an artificial intelligence fraud management solution embodiment of the present invention;

DETAILED DESCRIPTION OF THE INVENTION

Figure 2A:
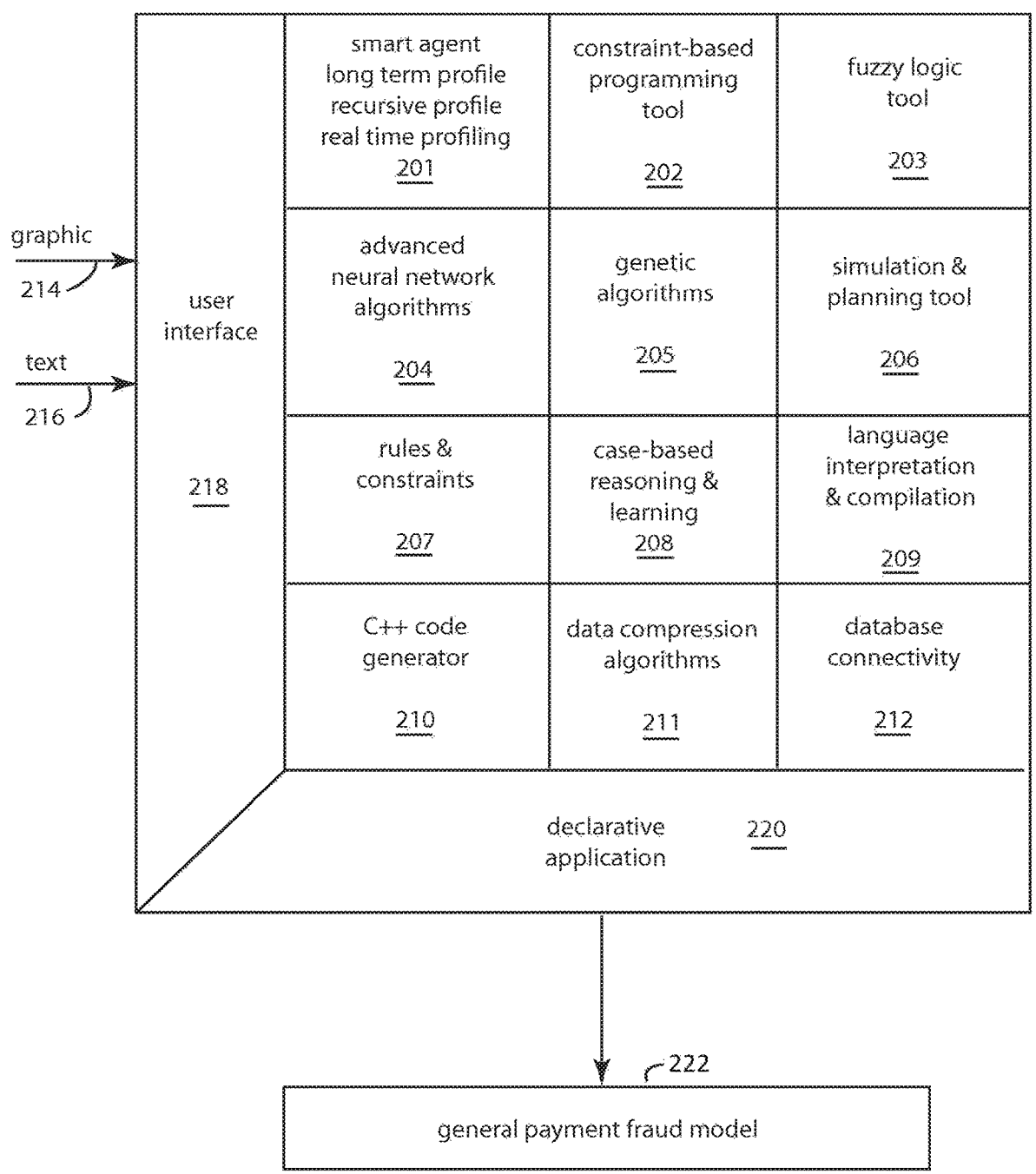
FIG. 2A is a functional block diagram of an application development system (ADS) embodiment of the present invention for fraud-based target applications.

FIG. 1 represents an artificial intelligence fraud management solution embodiment of the present invention, and is referred to herein by the general reference numeral 100. Such solution 100 comprises an expert programmer development system 102 for building trainable general payment fraud models 104 that integrate several, but otherwise blank artificial intelligence classifiers, e.g., neural networks, case based reasoning, decision trees, genetic algorithms, fuzzy logic, and rules and constraints. These are further integrated by the expert programmers inputs 106 and development system 102 to include smart agents and associated real-time profiling, recursive profiles, and long-term profiles.

The trainable general payment fraud models 104 are trained with supervised and unsupervised data 108 and 110 to produce a trained payment fraud model 112 reflecting, for example, accountholder and historical transaction data. This trained payment fraud model 112 can then be sold as a computer program library or a software-as-a-service applied payment fraud model. This is applied by a commercial client in an applied payment fraud model 114 to process real-time transactions and authorization requests 116 for fraud scores. The applied payment fraud model 114 is further able to accept a client tuning input 120.

FIG. 2A represents an application development system (ADS) embodiment of the present invention for fraud-based target applications, and is referred to herein by the general reference numeral 200. Such is the equivalent of development system 102 in FIG. 1. ADS 200 comprises a number of computer program development libraries and tools that highly skilled artificial intelligence scientists and artisans can manipulate into a novel combination of complementary technologies. In an early embodiment of ADS 200 we combined a goal-oriented multi-agent technology 201 for building run-time smart agents, a constraint-based programming tool 202, a fuzzy logic tool 203, a library of genetic algorithms 205, a simulation and planning tool 206, a library of business rules and constraints 207, case-based reasoning and learning tools 208, a real-time interpreted language compiler 209, a C++ code generator 210, a library of data compression algorithms 211, and a database connectivity tool 212.

The highly skilled artificial intelligence scientists and artisans provide graphical and textual inputs 214 and 216 to a user interface (UI) 218 to manipulate the novel combinations of complementary technologies into a declarative application 220.

Declarative application 220 is molded, modeled, simulated, tested, corrected, massaged, and unified into a fully functional hybrid combination that is eventually output as a trainable general payment fraud model 222. Such is the equivalent of trainable general payment fraud model 104 in FIG. 1.

It was discovered by the present inventor that the highly skilled artificial intelligence scientists and artisans that could manipulate the complementary technologies mentioned into specific novel combinations required exceedingly talented individuals that were in short supply.

It was, however, possible to build and to prove out that ADS 200 as a compiler would produce trainable general payment fraud models 222, and these were more commercially attractive and viable.

After many years of experimental use and trials, ADS 200 was constantly improved and updated. Database connectivity tool 212, for example, tried to press conventional databases into service during run-time to receive and supply datapoints in real-time transaction service. It turned out no conventional databases were up to it.

Figure 2B:
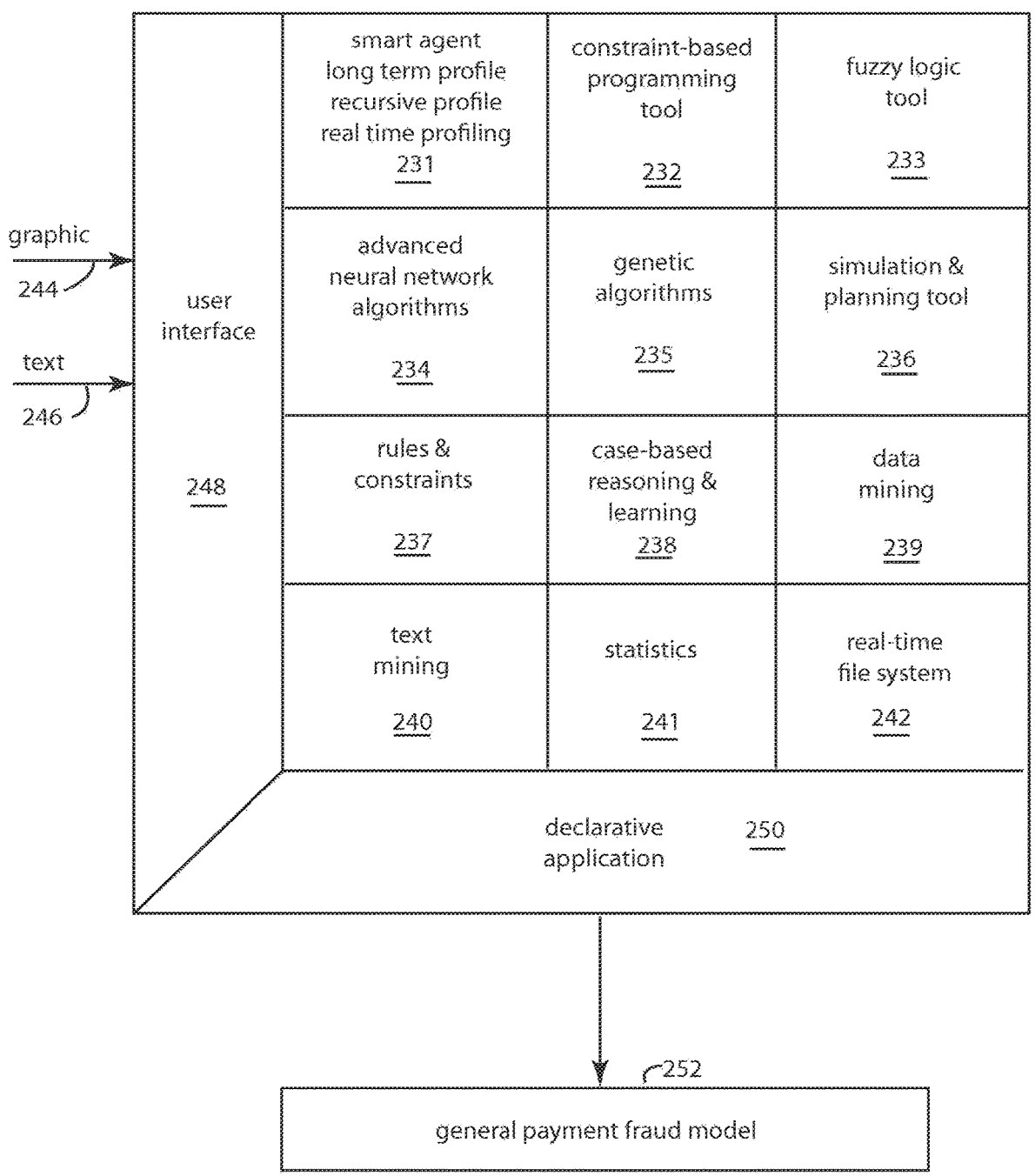
FIG. 2B is a functional block diagram of an improved and updated application development system (ADS) embodiment of the present invention for fraud-based target applications.

At the present, an updated and improved ADS shown with general reference numeral 230 in FIG. 2B is providing better and more useful trainable general payment fraud models.

ADS 230 is the most recent equivalent of development system 102 in FIG. 1. ADS 230 assembles together a different mix of computer program development libraries and tools for the highly skilled artificial intelligence scientists and artisans to manipulate into a new hybrid of still complementary technologies.

In this later embodiment, ADS 230, we combined an improved smart-agent technology 231 for building run-time smart agents that are essentially only silhouettes of their constituent attributes. These attributes are themselves smart-agents with second level attributes and values that are able to "call" on real-time profilers, recursive profilers, and long term profilers. Such profilers can provide comparative assessments of each datapoint with the new information flowing in during run-time. In general, "real-time" profiles include transactions less than ninety days old. Long-term profiles accumulate transactions over ninety days old. In some applications, the line of demarcation was forty-five days, due to data storage concerns. Recursive profiles are those that inspect what an entity's peers have done in comparison.

The three profilers can thereafter throw exceptions in each datapoint category, and the number and quality of exceptions thrown across the breadth of the attributes then incoming will produce a fraud risk score that generally raises exponentially with that number of exceptions thrown. Oracle explains in C++ programming that exceptions provide a way to react to exceptional circumstances (like fraud suspected) in programs by transferring control to special functions called "handlers".

At the top level of a hierarchy of smart agents linked by their attributes are the smart agents for the independent actors who can engage in fraud. In a payment fraud model, that top level will be the cardholders as tracked by the cardholder account numbers reported in transaction data.

These top level smart agents can call on a moving 15-minute window file that has all the transactions reported to the system in the last 15-minutes. Too much activity in 15-minutes by any one actor is cause for further inspection and analysis.

ADS 230 further comprises a constraint-based programming tool 232, a fuzzy logic tool 233, a library of advanced neural network algorithms 234, a library of genetic algorithms 235, a simulation and planning tool 236, a library of business rules and constraints 237, case-based reasoning and learning tools 238, a data mining tool 239, a text mining tool 240, a statistical tool 241 and a real-time file system 242.

The real-time file system 242 is a simple organization of attribute values for smart agent profilers that allow quick, direct file access.

The highly skilled artificial intelligence scientists and artisans provide graphical and textual inputs 244 and 246 to a user interface (UI) 248 to manipulate the novel combinations of complementary technologies into a declarative application 250.

Declarative application 250 is also molded, modeled, simulated, tested, corrected, massaged, and unified into a fully functional hybrid combination that is eventually output as a trainable general payment fraud model 252. Such is also the more improved equivalent of trainable general payment fraud model 104 in FIG. 1.

The constraint-based programming tools 202 and 232 limit the number of possible solutions. Complex conditions with complex constraints can create an exponential number of possibilities. Fixed constraints, fuzzy constraints, and polynomials are combined in cases where no exact solution exists. New constraints can be added or deleted at any time. The dynamic nature of the tool makes possible real-time simulations of complex plans, schedules, and diagnostics.

The constraint-based programming tools are written as a very complete language in its own right. It can integrate a variety of variables and constraints, as in the following Table.

---

Variables: Real, with integer values, enumerated, sets, matrices and vectors, intervals, fuzzy subsets, and more.

Arithmetic Constraints: =, +, −, *, /, /=, >, <, >=, <=, interval addition, interval subtraction, interval multiplication and interval division, max, min, intersection, union, exponential, modulo, logarithm, and more.

Temporal (Allen) Constraints: Control allows you to write any temporal constraints including Equal, N-equal, Before, After, Meets, Overlaps, Starts, Finishes, and personal temporal operators such as Disjoint, Started-by, Overlapped-by, Met-by, Finished-by, and more.

Boolean Constraints: Or, And, Not, XOR, Implication, Equivalence

Symbolic Constraints: Inclusion, Union, Intersection, Cardinality, Belonging, and more.

---

The constraint-based programming tools 202 and 232 include a library of ways to arrange subsystems, constraints and variables. Control strategies and operators can be defined within or outside using traditional languages such as C, C++,FORTRAN, etc. Programmers do not have to learn a new language, and an easy-to-master programming interface provides an in-depth library and traditional tools.

Fuzzy logic tools 203 and 233 recognize many of the largest problems in organizations cannot be solved by simple yes/no or black/white answers. Sometimes the answers need to be rendered in shades of gray. This is where fuzzy logic proves useful. Fuzzy logic handles imprecision or uncertainty by attaching various measures of credibility to propositions. Such technology enables clear definitions of problems where only imperfect or partial knowledge exists, such as when a goal is approximate, or between all and nothing. In fraud applications, this can equate to the answer being "maybe" fraud is present, and the circumstances warrant further investigation.

Tools 204 and 234 provide twelve different neural network algorithms, including Back propagation, Kohonen, Art, Fuzzy ART, RBF and others, in an easy-to-implement C++ library. Neural networks are algorithmic systems that interpret historical data to identify trends and patterns against which to compare subject cases. The libraries of advanced neural network algorithms can be used to translate databases to neurons without user intervention, and can significantly accelerate the speed of convergence over conventional back propagation, and other neural network algorithms. The present invention's neural net is incremental and adaptive, allowing the size of the output classes to change dynamically. An expert mode in the advanced application development tool suite provides a library of twelve different neural network models for use in customization.

Neural networks can detect trends and patterns other computer techniques are unable to. Neurons work collaboratively to solve the defined problem. Neural networks are adept in areas that resemble human reasoning, making them well suited to solve problems that involve pattern recognition and forecasting. Thus, neural networks can solve problems that are too complex to solve with conventional technologies.

Libraries 205 and 235 include genetic algorithms to initialize a population of elements where each element represents one possible set of initial attributes. Once the models are designed based on these elements, a blind test performance is used as the evaluation function. The genetic algorithm will be then used to select the attributes that will be used in the design of the final models. The component particularly helps when multiple outcomes may achieve the same predefined goal. For instance, if a problem can be solved profitably in any number of ways, genetic algorithms can determine the most profitable way.

Simulation and planning tool 206 can be used during model designs to check the performances of the models.

Business rules and constraints 207 provides a central storage of best practices and know how that can be applied to current situations. Rules and constraints can continue to be captured over the course of years, applying them to the resolution of current problems.

Case-based reasoning 208 uses past experiences in solving similar problems to solve new problems. Each case is a history outlined by its descriptors and the steps that lead to a particular outcome. Previous cases and outcomes are stored and organized in a database. When a similar situation presents itself again later, a number of solutions that can be tried, or should be avoided, will present immediately. Solutions to complex problems can avoid delays in calculations and processing, and be offered very quickly.

Language interpretation tool 209 provides a constant feedback and evaluation loop. Intermediary Code generator 210 translates Declarative Applications 220 designed by any expert into a faster program for a target host.

During runtime, real time transaction data can be received and processed according to declarative application 220 by the target host with the objective of producing run-time fraud detections. For example, in a payments application card payments transaction requests from merchants can be analyzed for fraud activity. In healthcare applications the reports and compensation demands of providers can be scanned for fraud. And in insider trader applications individual traders can be scrutinized for special knowledge that could have illegally helped them profit from stock market moves.

File compression algorithms library 211 helps preserve network bandwidth by compressing data at the user's discretion.

Figure 3:
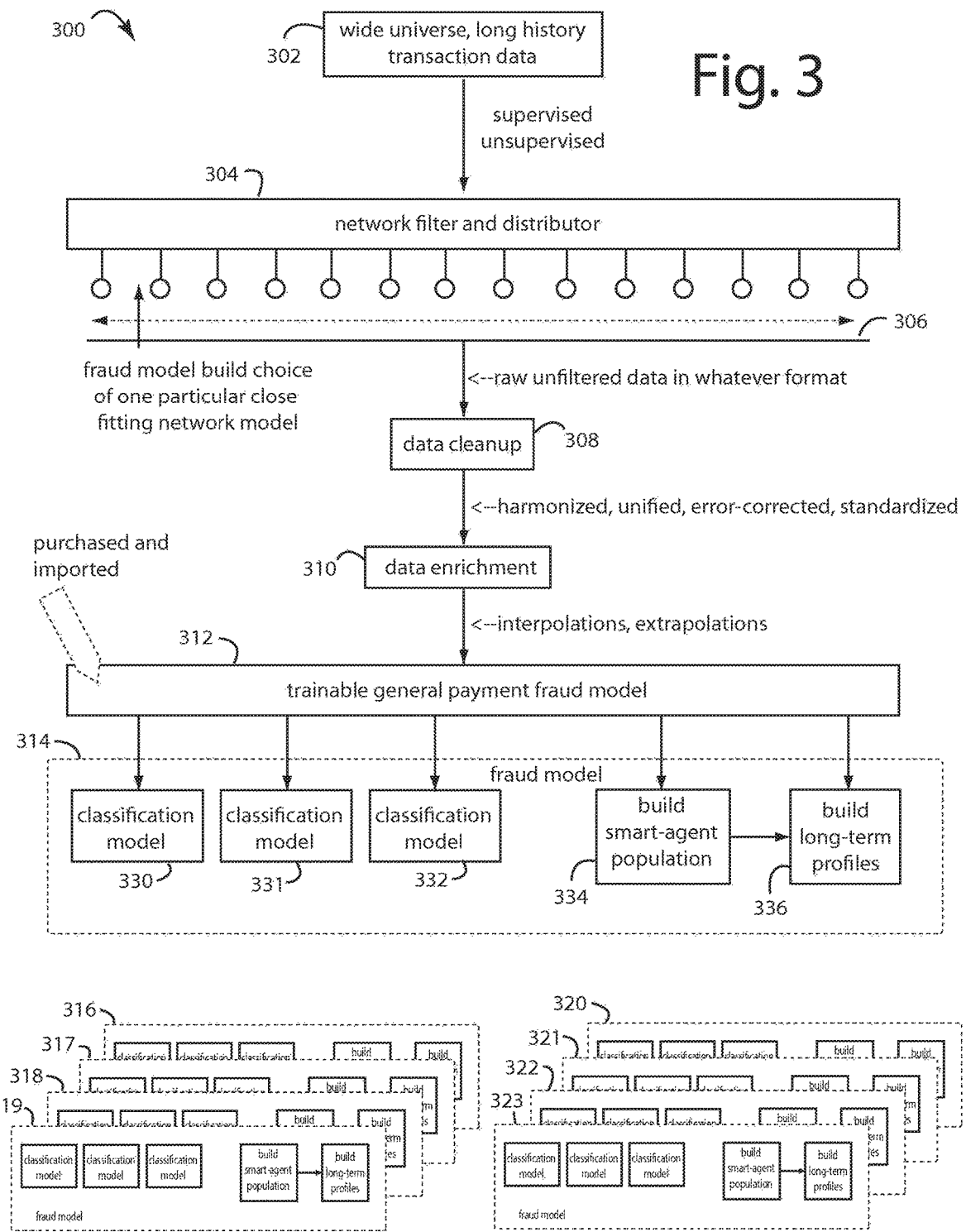
FIG. 3 is a functional block diagram of a model training embodiment of the present invention.

FIG. 3 represents a model training embodiment of the present invention, and is referred to herein by the general reference numeral 300. Model trainer 300 can be fed a very complete, comprehensive transaction history 302 that can include both supervised and unsupervised data. A filter 304 actually comprises many individual filters that can be selected by a switch 306. Each filter can separate the supervised and unsupervised data from comprehensive transaction history 302 into a stream correlated by some factor in each transaction.

The resulting filtered training data will produce a trained model that will be highly specific and sensitive to fraud in the filtered category. When two or more of these specialized trained models used in parallel are combined in other embodiments of the present invention they will excel in real-time cross-channel fraud prevention.

In a payment card fraud embodiment of the present invention, during model training, the filters 304 are selected by switch 306 to filter through dozens of different channels, one-at-a-time for each real-time, risk-scoring channel model that will be needed and later run together in parallel. For example, such channels can include channel transactions and authorization requests for card-not-present, card-present, high risk merchant category code (MCC), micro-merchant, small and medium sized enterprise (SME) finance, international, domestic, debit card, credit card, contactless, or other groupings or financial networks.

The objective here is to detect a first hint of fraud in any channel for a particular accountholder, and to "warn" all the other real-time, risk-scoring channel models that something suspicious is occurring with this accountholder. In one embodiment, the warning comprises an update in the nature of feedback to the real-time, long-term, and recursive profiles for that accountholder so that all the real-time, risk-scoring channel models step up together and increment the risk thresholds that accountholder will be permitted. More hits in more channels should translate to an immediate alert and shutdown of all the affected accountholders accounts.

Competitive prior art products make themselves immediately unattractive and difficult to use by insisting that training data suit some particular format. In reality, training data will come from multiple, disparate, dissimilar, incongruent, proprietary data sources simultaneously. A data cleanup process 308 is therefore important to include here to do coherence analysis, and to harmonize, unify, error-correct, and otherwise standardize the heterogeneous data coming from transaction data history 302. The commercial advantage of that is a wide range of clients with many different channels can provide their transaction data histories 302 in whatever formats and file structures are natural to the provider. It is expected that embodiments of the present invention will find applications in financial services, defense and cyber security, health and public service, technology, mobile payments, retail and e-commerce, marketing and social networking, and others.

A data enrichment process 310 computes interpolations and extrapolations of the training data, and expands it out to as many as two-hundred and fifty datapoints from the forty or so relevant datapoints originally provided by transaction data history 302.

A trainable fraud model 312 (like that illustrated in FIG. 1 as trainable general payment fraud model 104) is trained into a channel specialized fraud model 314, and each is the equivalent of the applied fraud model 114 illustrated in FIG. 1. The selected training results from the switch 306 setting and the filters 304 then existing.

Channel specialized fraud models 314 can be sold individually or in assorted varieties to clients, and then imported by them as a commercial software app, product, or library.

A variety of selected applied fraud models 316-323 represent the applied fraud models 114 that result with different settings of filter switch 306. Each selected applied fraud model 314 will include a hybrid of artificial intelligence classification models represented by models 330-332 and a smart-agent population build 334 with a corresponding set of real-time, recursive, and long-term profilers 336. The enriched data from data enrichment process 310 is fully represented in the smart-agent population build 334 and profilers 336.

Figure 4:
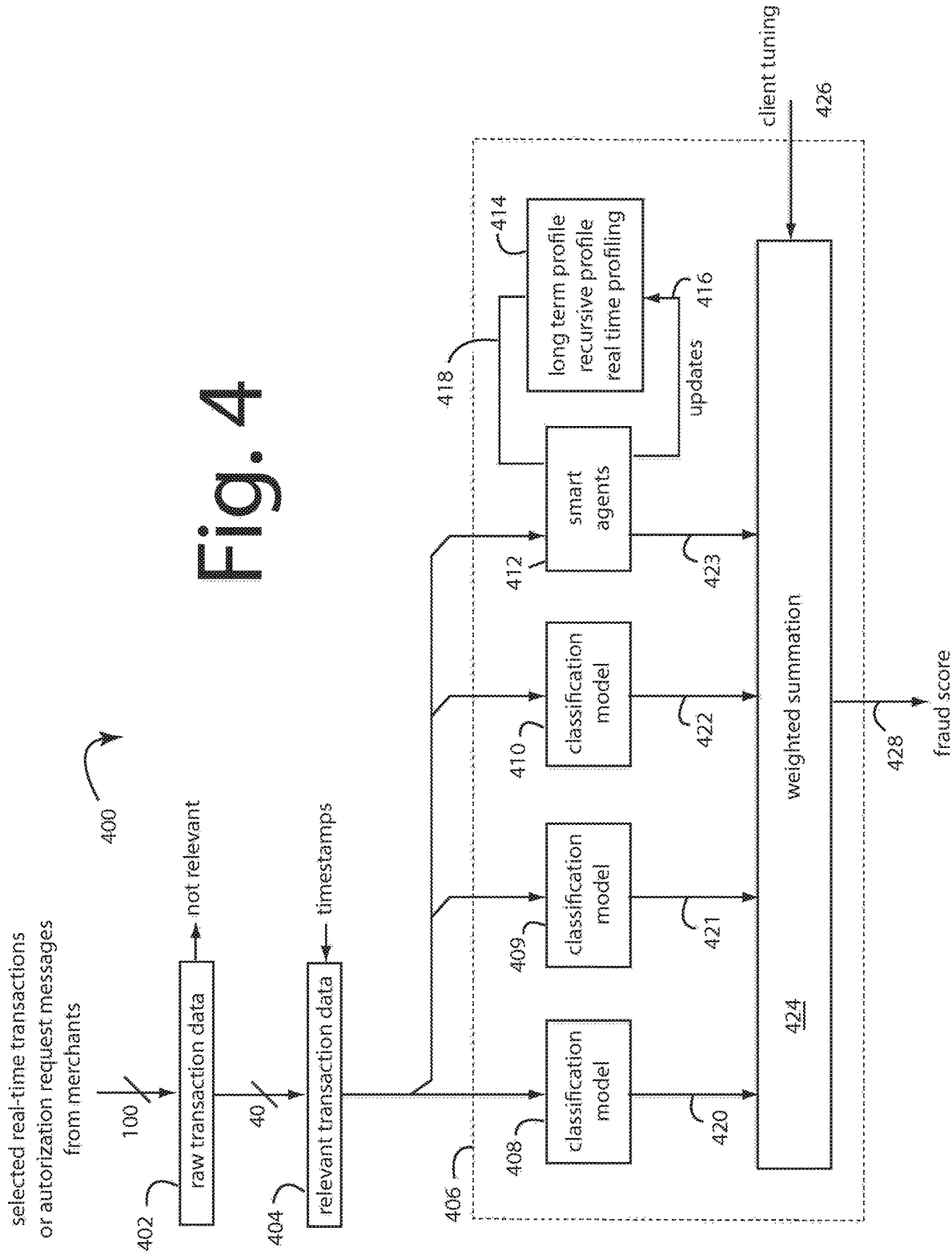
FIG. 4 is a functional block diagram of a real-time payment fraud management system like that illustrated in FIG. 1 as applied payment fraud model.

FIG. 4 represents a real-time payment fraud management system 400 like that illustrated in FIG. 1 as applied payment fraud model 114. A raw transaction separator 402 filters through the forty or so data items that are relevant to the computing of a fraud score. A process 404 adds timestamps to these relevant datapoints and passes them in parallel to a selected applied fraud model 406. This is equivalent to a selected one of applied fraud models 316-323 in FIG. 3 and applied payment fraud model 114 in FIG. 1.

During a session in which the time-stamped relevant transaction data flows in, a set of classification models 408-410 operate independently according to their respective natures. A population of smart agents 412 and profilers 414 also operate on the time-stamped relevant transaction data inflows. Each new line of time-stamped relevant transaction data will trigger an update 416 of the respective profilers 414. Their attributes 418 are provided to the population of smart agents 412.

The classification models 408-410 and population of smart agents 412 and profilers 414 all each produce an independent and separate vote or fraud score 420-423 on the same line of time-stamped relevant transaction data. A weighted summation processor 424 responds to client tunings 426 to output a final fraud score 428.

Figure 5:
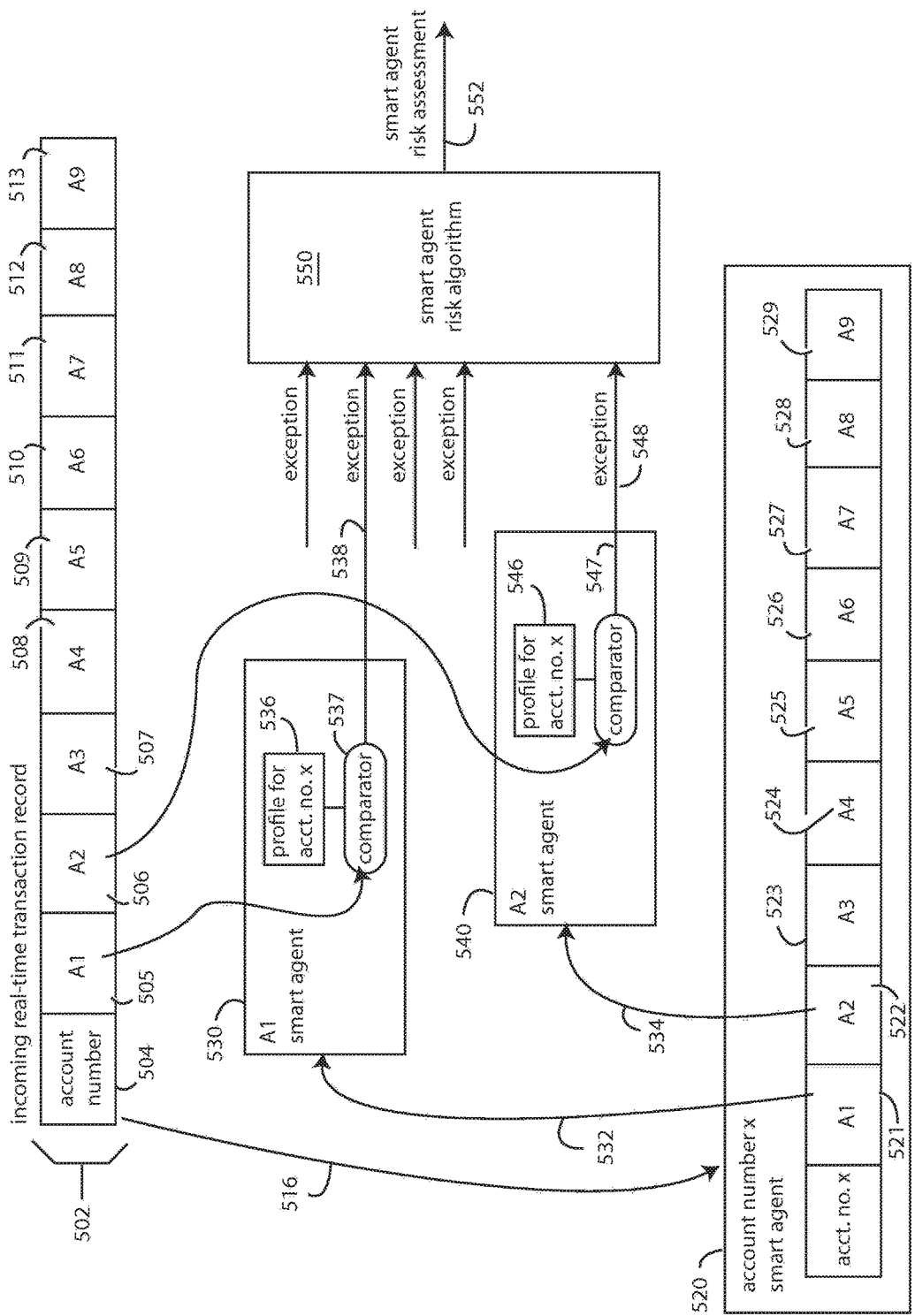
FIG. 5 is a functional block diagram of a smart agent process embodiment of the present invention.

FIG. 5 represents a smart agent process 500 in an embodiment of the present invention. For example, these would include the smart agent population build 334 and profiles 336 in FIG. 3 and smart agents 412 and profiles 414 in FIG. 4. A series of payment card transactions arriving in real-time in an authorization request message is represented here by a random instantaneous incoming real-time transaction record 502.

Such record 502 begins with an account number 504. It includes attributes A1-A9 numbered 505-513 here. These attributes, in the context of a payment card fraud application would include datapoints for card type, transaction type, merchant name, merchant category code (MCC), transaction amount, time of transaction, time of processing, etc.

Account number 504 in record 502 will issue a trigger 516 to a corresponding smart agent 520 to present itself for action. Smart agent 520 is simply a constitution of its attributes, again A1-A9 and numbered 521-529 in FIG. 5. These attributes A1-A9 521-529 are merely pointers to attribute smart agents. Two of these, one for A1 and one for A2, are represented in FIG. 5.

Here, an A1 smart agent 530 and an A2 smart agent 540. These are respectively called into action by triggers 532 and 542.

A1 smart agent 530 and A2 smart agent 540 will respectively fetch correspondent attributes 505 and 506 from incoming real-time transaction record 502. Smart agents for A3-A9 make similar fetches to themselves in parallel. They are not shown here to reduce the clutter for FIG. 5 that would otherwise result.

Each attribute smart agent like 530 and 540 will include or access a corresponding profile datapoint 536 and 546. This is actually a simplification of the three kinds of profiles 336 (FIG. 3) that were originally built during training and updated in update 416 (FIG. 4). These profiles are used to track what is "normal" behavior for the particular account number for the particular single attribute.

For example, if one of the attributes reports the MCC's of the merchants and another reports the transaction amounts, then if the long-term, recursive, and real time profiles for a particular account number x shows a pattern of purchases at the local Horne Depot and Costco that average $100-$300, then an instantaneous incoming real-time transaction record 502 that reports another $200 purchase at the local Costco will raise no alarms. But a sudden, unique, inexplicable purchase for $1250 at a New York Jeweler will and should throw more than one exception.

Each attribute smart agent like 530 and 540 will further include a comparator 537 and 547 that will be able to compare the corresponding attribute in the instantaneous incoming real-time transaction record 502 for account number x with the same attributes held by the profiles for the same account. Comparators 537 and 547 should accept some slack, but not too much. Each can throw an exception 538 and 548, as can the comparators in all the other attribute smart agents. It may be useful for the exceptions to be a fuzzy value, e.g., an analog signal 0.0 to 1.0. Or it could be a simple binary one or zero. What sort of excursions should trigger an exception is preferably adjustable, for example with client tunings 426 in FIG. 4.

These exceptions are collected by a smart agent risk algorithm 550. One deviation or exception thrown on any one attribute being "abnormal" can be tolerated if not too egregious. But two or more should be weighted more than just the simple sum, e.g., $(1+1)^n=2^n$ instead of simply $1+1=2$. The product is output as a smart agent risk assessment 552. This output is the equivalent of independent and separate vote or fraud score 423 in FIG. 4.

Figure 6:
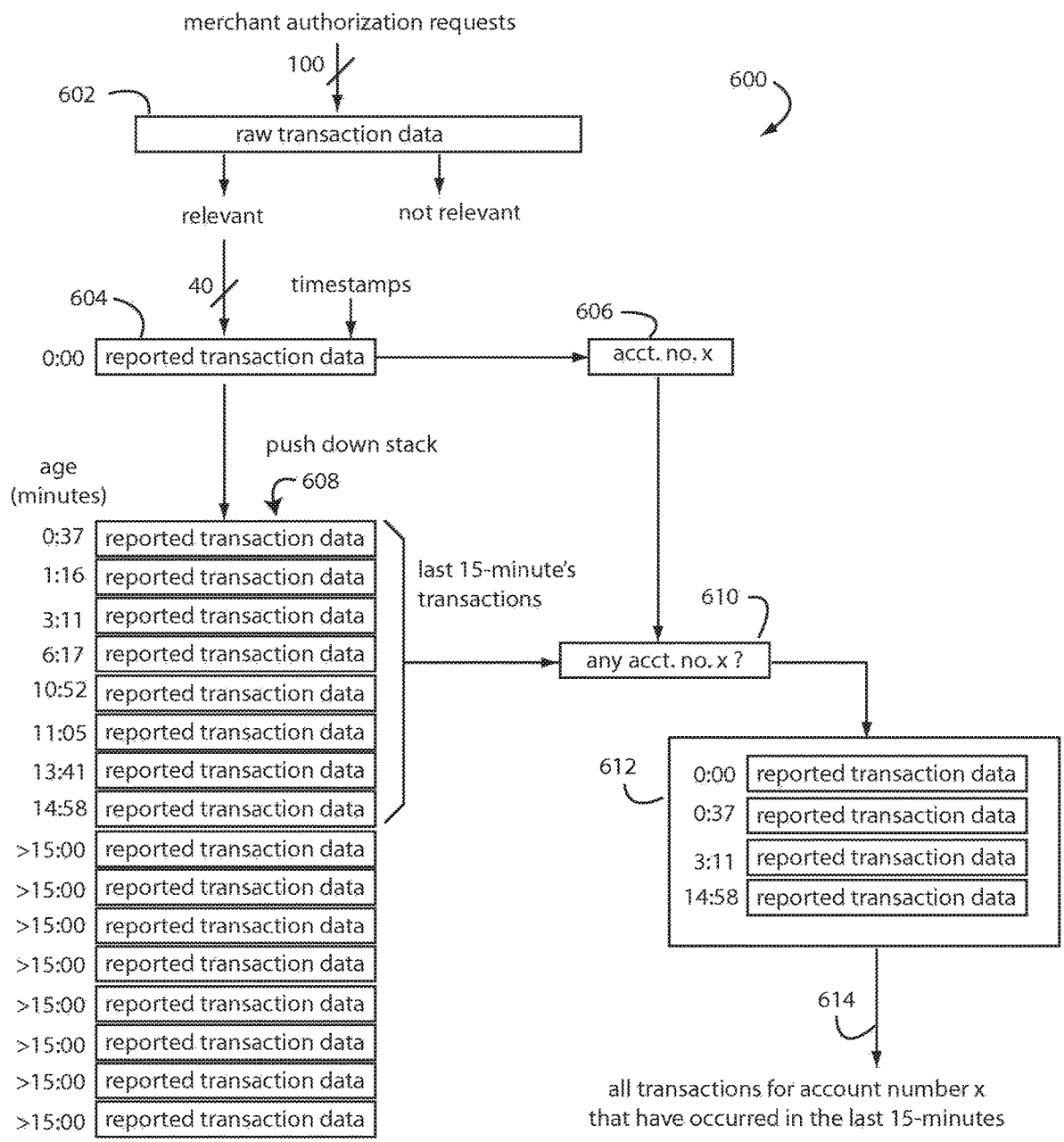
FIG. 6 is a functional block diagram of a most recent fifteen-minute transaction velocity counter.

FIG. 6 represents a most recent 15-minute transaction velocity counter 600, in an embodiment of the present invention. It receives the same kind of real-time transaction data inputs as were described in connection with FIG. 4 as raw transaction data 402 and FIG. 5 as records 502. A raw transaction record 602 includes a hundred or so datapoints. About forty of those datapoints are relevant to fraud detection and are identified in FIG. 6 as reported transaction data 604.

The reported transaction data 604 arrive in a time series and randomly involve a variety of active account numbers. But, let's say the most current reported transaction data 604 with a time age of 0:00 concerns a particular account number x. That fills a register 606.

Earlier arriving reported transaction data 604 build a transaction time-series stack 608. FIG. 6 arbitrarily identifies the respective ages of members of transaction time-series stack 608 with example ages 0:73, 1:16, 3:11, 6:17, 10:52, 11:05, 13:41, and 14:58. Those aged more than 15-minutes are simply identified with ages ">15:00". This embodiment of the present invention is concerned with only the last 15-minutes worth of transactions. As time passes transaction time-series stack 608 pushes down.

The key concern is whether account number x has been involved in any other transactions in the last 15-minutes. A search process 610 accepts a search key from register 606 and reports any matches in the 15-minute window with an account activity velocity counter 612. Too much very recent activity can hint there is a fraudster at work, or it may be normal behavior. A trigger 614 is issued that can be fed to an additional attribute smart agent that is included with attributes smart agents 530 and 540 and the others in parallel. Exception from this new account activity velocity counter smart agent is input to smart agent risk algorithm 550 in FIG. 5.

Figure 7:
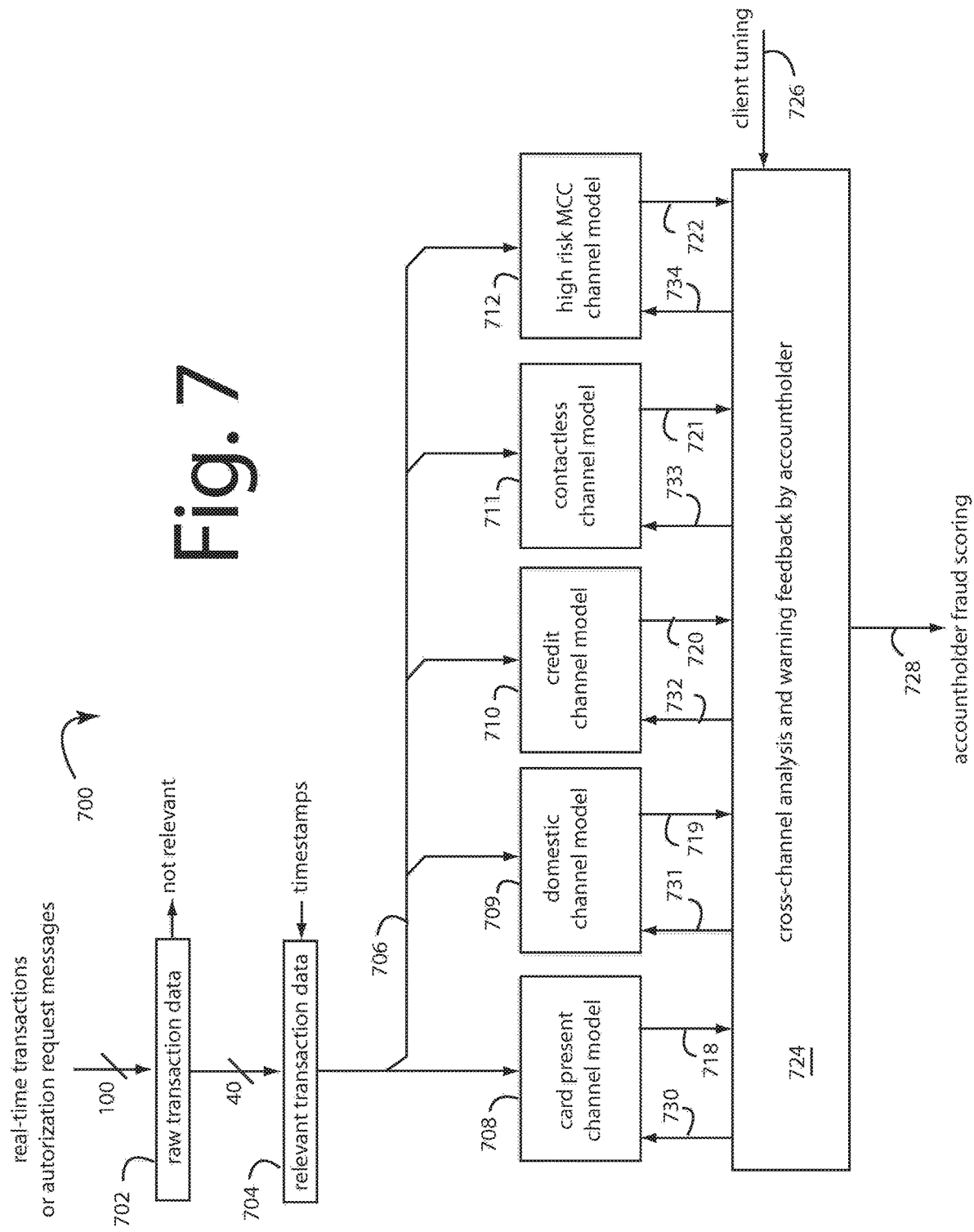
FIG. 7 is a functional block diagram of a cross-channel payment fraud management embodiment of the present invention.

FIG. 7 represents a cross-channel payment fraud management embodiment of the present invention, and is referred to herein by general reference numeral 700.

Real-time cross-channel monitoring uses track cross channel and cross product patterns to cross pollinate information for more accurate decisions. Such track not only the channel where the fraud ends but also the initiating channel to deliver holistic fraud monitoring. A standalone internet banking fraud solution will allow a transaction if it is within its limits, however if core banking is in the picture, then it will stop this transaction, as we additionally know the source of funding of this account (which mostly is missing in internet banking).

In FIG. 3, a variety of selected applied fraud models 316-323 represent the applied fraud models 114 that result with different settings of filter switch 306. A real-time cross-channel monitoring payment network server can be constructed by running several of these selected applied fraud models 316-323 in parallel.

FIG. 7 represents a real-time cross-channel monitoring payment network server 700, in an embodiment of the present invention. Each customer or accountholder of a financial institution can have several very different kinds of accounts and use them in very different transactional channels. For example, card-present, domestic, credit card, contactless, and high risk MCC channels. So in order for a cross-channel fraud detection system to work at its best, all the transaction data from all the channels is funneled into one pipe for analysis.

Real-time transactions and authorization requests data is input and stripped of irrelevant datapoints by a process 702. The resulting relevant data is time-stamped in a process 704. The 15-minute vector process of FIG. 6 may be engaged at this point in the background. A bus 706 feeds the data in parallel line-by-line, e.g., to a selected applied fraud channel model for card present 708, domestic 709, credit 710, contactless 711, and high risk MCC 712. Each can pop an exception to the current line input data with an evaluation flag or score 718-722. The involved accountholder is understood.

These exceptions are collected and analyzed by a process 724 that can issue warning feedback for the profiles maintained for each accountholder. Each selected applied fraud channel model 708-712 shares risk information about particular accountholders with the other selected applied fraud models 708-712. A suspicious or outright fraudulent transaction detected by a first selected applied fraud channel model 708-712 for a particular customer in one channel is cause for a risk adjustment for that same customer in all the other applied fraud models for the other channels. Exceptions 718-722 to an instant transaction on bus 706 trigger an automated examination of the customer or accountholder involved in a profiling process 724, especially with respect to the 15-minute vectors and activity in the other channels for the instant accountholder. A client tuning input 726 will affect an ultimate accountholder fraud scoring output 728, e.g., by changing the respective risk thresholds for genuine-suspicious-fraudulent determinations.

A corresponding set of warning triggers 730-734 is fed back to all the applied fraud channel models 708-712. A compromised accountholder result indicated by accountholder fraud scoring 728 can be expected to be a highly accurate and early protection warning.

In general, a process for cross-channel financial fraud protection comprises training a variety of real-time, risk-scoring fraud models with training data selected for each from a common transaction history to specialize each member in the monitoring of a selected channel. Then arranging the variety of real-time, risk-scoring fraud models after the training into a parallel arrangement so that all receive a mixed channel flow of real-time transaction data or authorization requests. The parallel arrangement of diversely-trained real-time, risk-scoring fraud models is hosted on a network server platform for real-time risk scoring of the mixed channel flow of real time transaction data or authorization requests. Risk thresholds are immediately updated for particular accountholders in every member of the parallel arrangement of diversely-trained real-time, risk-scoring fraud models when any one of them detects a suspicious or outright fraudulent transaction data or authorization request for the accountholder. So, a compromise, takeover, or suspicious activity of the accountholder's account in any one channel is thereafter prevented from being employed to perpetrate a fraud in any of the other channels.

Such process for cross-channel financial fraud protection can further comprise steps for building a population of real-time and a long-term and a recursive profile for each accountholder in each of the real-time, risk-scoring fraud models. During real-time use, the real-time, long-term, and recursive profiles for each accountholder in each and all of the real-time, risk-scoring fraud models are maintained and updated with newly arriving data. If, during real-time use, a compromise, takeover, or suspicious activity of the accountholder's account in any one channel is detected, then the real-time, long-term, and recursive profiles for each accountholder in each and all of the other real-time, risk-scoring fraud models are updated to further include an elevated risk flag. The elevated risk flags are included in accountholder fraud scoring 728 for the current transaction or authorization request.

The 15-minute vectors described in FIG. 6 are a way to cross pollenate risks calculated in one channel with the others. The 15-minute vectors can represent an amalgamation of transactions in all channels, or channel-by channel. Once a 15-minute vector has aged, it can be shifted into a 30-minute vector, a one-hour vector, and a whole day vector by a simple shift register means. These vectors represent velocity counts that can be very effective in catching fraud as it is occurring in real time.

In every case, embodiments of the present invention include adaptive learning that combines three learning techniques to evolve the artificial intelligence classifiers, e.g., 408-414. First is the automatic creation of profiles, or smart-agents, from historical data, e.g., long-term profiling. See FIG. 3. The second is real-time learning, e.g., enrichment of the smart-agents based on real-time activities. See FIG. 4. The third is adaptive learning carried by incremental learning algorithms. See FIG. 7.

For example, two years of historical credit card transactions data needed over twenty seven terabytes of database storage. A smart-agent is created for each individual card in that data in a first learning step, e.g., long-term profiling. Each profile is created from the card's activities and transactions that took place over the two year period. Each profile for each smart-agent comprises knowledge extracted field-by-field, such as merchant category code (MCC), time, amount for an mcc over a period of time, recursive profiling, zip codes, type of merchant, monthly aggregation, activity during the week, weekend, holidays, Card not present (CNP) versus card present (CP), domestic versus cross-border, etc. this profile will highlight all the normal activities of the smart-agent (specific card).

Smart-agent technology has been observed to outperform conventional artificial and machine learning technologies. For example, data mining technology creates a decision tree from historical data. When historical data is applied to data mining algorithms, the result is a decision tree. Decision tree logic can be used to detect fraud in credit card transactions. But, there are limits to data mining technology. The first is data mining can only learn from historical data and it generates decision tree logic that applies to all the cardholders as a group. The same logic is applied to all cardholders even though each merchant may have a unique activity pattern and each cardholder may have a unique spending pattern.

A second limitation is decision trees become immediately outdated. Fraud schemes continue to evolve, but the decision tree was fixed with examples that do not contain new fraud schemes. So stagnant non-adapting decision trees will fail to detect new types of fraud, and do not have the ability to respond to the highly volatile nature of fraud.

Another technology widely used is "business rules" which requires actual business experts to write the rules, e.g., if-then-else logic. The most important limitations here are that the business rules require writing rules that are supposed to work for whole categories of customers. This requires the population to be sliced into many categories (students, seniors, zip codes, etc.) and asks the experts to provide rules that apply to all the cardholders of a category.

How could the US population be sliced? Even worse, why would all the cardholders in a category all have the same behavior? It is plain that business rules logic has built-in limits, and poor detection rates with high false positives. What should also be obvious is the rules are outdated as soon as they are written because conventionally they don't adapt at all to new fraud schemes or data shifts.

Neural network technology also has limits; it uses historical data to create a matrix weights for future data classification. The Neural network will use as input (first layer) the historical transactions and the classification (for fraud or not as an output). Neural Networks only learn from past transactions and cannot detect any new fraud schemes (that arise daily) if the neural network is not re-trained with this type of fraud. Same as with data mining and business rules, the classification logic learned from the historical data will be applied to all the cardholders even though each merchant has a unique activity pattern and each cardholder has a unique spending pattern.

Another limit is the classification logic learned from historical data is outdated the same day of its use because the fraud schemes change but the neural network does not learn with examples that contain such new type(s) of fraud schemes, and will fail to detect such new type(s) of fraud because it lacks the ability to adapt to new fraud schemes and does not have the ability to respond to the highly volatile nature of fraud.

Contrary to previous technologies, smart-agent technology learns the specific behaviors of each cardholder and creates a smart-agent that follows the behavior of each cardholder. Because it learns from each activity of a cardholder, the smart-agent updates the profiles and makes effective changes at runtime. It is the only technology with an ability to identify and stop, in real-time, previously unknown fraud schemes. It has the highest detection rate and lowest false positives because it separately follows and learns the behaviors of each cardholder.

Smart-agents have a further advantage in data size reduction. Once, say, twenty-seven terabytes of historical data is transformed into smart-agents, only 200-gigabytes is needed to represent twenty-seven million distinct smart-agents corresponding to all the distinct cardholders.

Incremental learning technologies are embedded in the machine algorithms and smart-agent technology to continually re-train from any false positives and negatives that occur along the way. Each corrects itself to avoid repeating the same classification errors. Data mining logic incrementally changes the decision trees by creating a new link or updating the existing links and weights. Neural networks update the weight matrix, and case-based reasoning logic updates generic cases or creates new ones. Smart-agents update their profiles by adjusting the normal/abnormal thresholds, or by creating exceptions.

In real-time behavioral profiling by the smart-agents, both the real-time and long-term engines require high speed transfers and lots of processor attention. Conventional database systems cannot provide the transfer speeds necessary, and the processing burdens cannot be tolerated.

Embodiments of the present invention include a fast, low overhead, custom file format and storage engine designed to retrieve profiles in real-time with a constant low load and save time. For example, the profiles 336 built in FIG. 3, and long-term, recursive, and real-time profiles 414 in FIG. 4.

Figure 8:
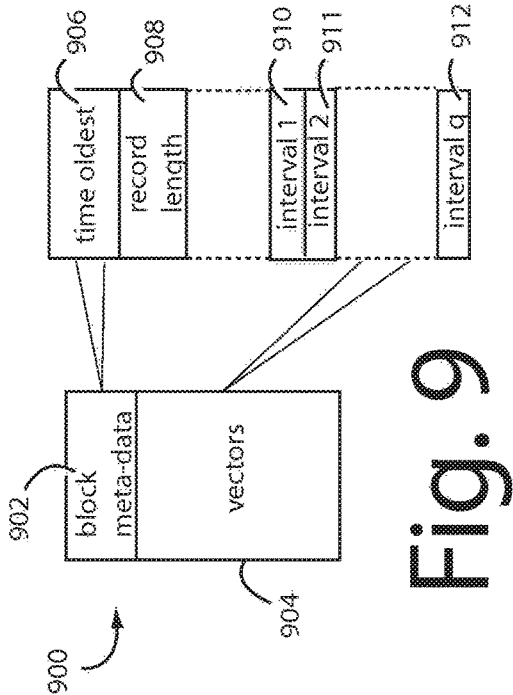
FIG. 8 is a diagram of a group of smart agent profiles stored in a custom binary file.

Referring now to FIG. 8, a group of smart agent profiles is stored in a custom binary file 800 which starts with a meta-data section 802 containing a profile definition, and a number of fixed size profile blocks, e.g., 804, 805, . . . 806 each containing the respective profiles. Such profiles are individually reserved to and used by a corresponding smart agent, e.g., profile 536 and smart agent 530 in FIG. 5. Fast file access to the profiles is needed on the arrival of every transaction 502. In FIG. 5, account number 504 signals the particular smart agents and profiles to access and that are required to provide a smart agent risk assessment 552 in real-time. For example, an approval or a denial in response to an authorization request message.

Figure 9:
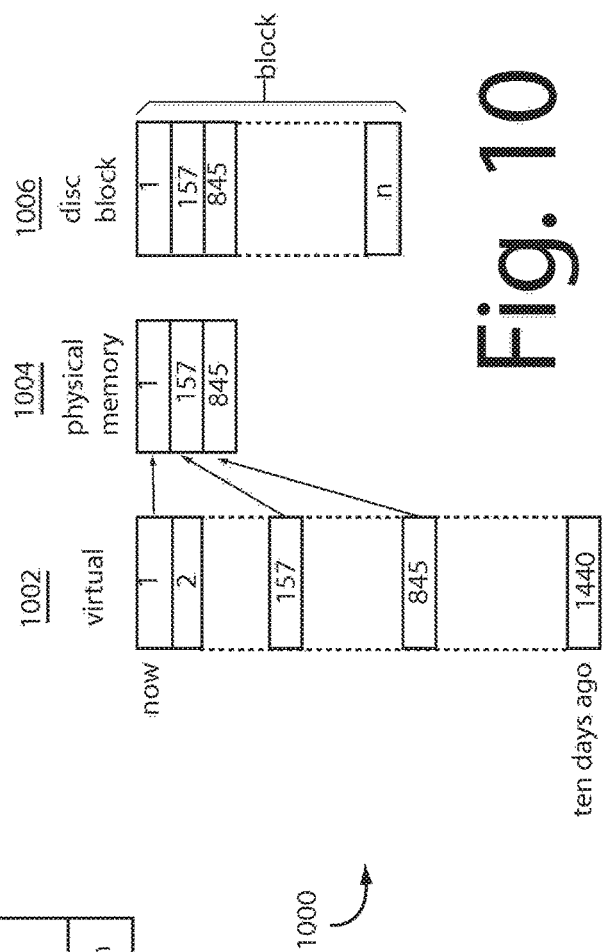
FIG. 9 is a diagram of the file contents of an exemplary smart agent profile.

FIG. 9 represents what's inside each such profile, e.g., a profile 900 includes a meta-data block 902 and a rolling list of vectors 904. The meta-data block 902 comprises the oldest one's time field 906, and a record length field 908. Transaction events are timestamped, recorded, and indexed by a specified atomic interval, e.g., ten minute intervals are typical, which is six hundred seconds. Each vector points to a run of profile datapoints that all share the same time interval, e.g., intervals 910-912. Some intervals will have no events, and therefore no vectors 904. Here, all the time intervals less than ninety days old are considered by the real-time (RT) profiles. Ones older than that are amalgamated into the respective long-term (LT) profiles.

What was purchased and how long ago a transaction for a particular accountholder occurred, and when their other recent transactions occurred, can provide valuable insights into whether the transactions the accountholder is presently engaging in are normal and in character, or deviating. Forcing a fraud management and protection system to hunt a conventional database for every transaction a particular random accountholder engaged in is not practical. The accountholders' transactions must be pre-organized into their respective profiles so they are always randomly available for instant calculations. How that is made possible in embodiments of the present invention is illustrated here in FIGS. 5, 6, and 8-10.

Figure 10:
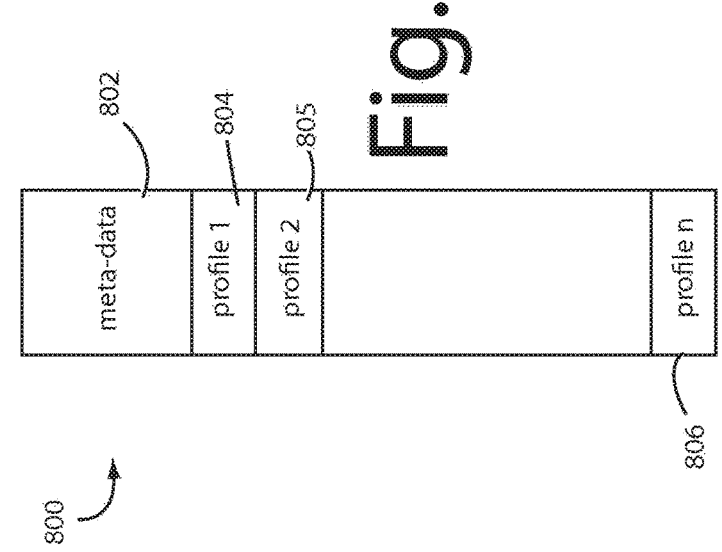
FIG. 10 is a diagram of a virtual addressing scheme used to access transactions in atomic time intervals by their profile vectors.

FIG. 10 illustrates a virtual memory system 1000 in which a virtual address representation 1002 is translated into a physical memory address 1004, and/or a disk block address 1006.

Profiling herein looks at events that occurred over a specific span of time. Any vectors that were assigned to events older than that are retired and made available for re-assignment to new events as they are added to the beginning of the list.

The following pseudo-code examples represent how smart agents (e.g., 412, 550) lookup profiles and make behavior deviation computations. A first step when a new transaction (e.g., 502) arrives is to find the one profile it should be directed to in the memory or filing system.

```
find_profile( T:transaction, PT :Profile's Type )
Begin
   Extract the value from T for each key used in the routing logic for PT
   Combine the values from each key into PK
   Search for PK in the in-memory index
   If found, load the profile in the file of type PT based on the indexed position.
   Else, this is a new element without a profile of type PT yet.
End
```

If the profile is not a new one, then it can be updated, otherwise a new one has to be created.

```
update_profile( T: transaction, PT :Profile's Type )
Begin
   find_profile of type PT P associated to T
   Deduce the timestamp t associated to T
   If P is empty, then add a new record based on the atomic interval for t
   Else locate the record to update based on t
      If there is no record associated to t yet,
      Then add a new record based on the atomic interval for t
      For each datapoint in the profile, update the record with the values in T
      (by increasing a count, sum, deducing a new minimum, maximum ...).
      Save the update to disk
End
```

```
compute_profile( T: transaction, PT : Profile's Type)
Begin
   update_profile P of type PT with T
   Deduce the timestamp t associated to T
   For each datapoint DP in the profile,
      Initialize the counter C
      For each record R in the profile P
         If the timestamp t associated to R belongs to the span of time for DR
         Then update C with the value of DB in the record R (by increasing
            a count, sum, deducing a new minimum, maximum ...)
      End For
   End For
   Return the values for each counter C
End
```

```
compute_profile( T: transaction, PT : Profile's Type)
Begin
    update_profile P of type PT with T
    Deduce the timestamp t associated to T
    For each datapoint DP in the profile,
        Initialize the counter C
        For each record R in the profile P
            If the timestamp t associated to R belongs to the span of time for
            DR
            Then update C with the value of DB in the record R (by increasing
                a count, sum, deducing a new minimum, maximum ...)
            End For
    End For
    Return the values for each counter C
End
```

The entity's behavior in the instant transaction is then analyzed to determine if the real-time (RT) behavior is out of the norm defined in the corresponding long-term (LT) profile. If a threshold (T) is exceeded, the transaction risk score is incremented.

```
analyze_entity_behavior( T: transaction)
Begin
    Get the real-time profile RT by calling compute_profile( T, real-time)
    Get the long-term profile LT by calling compute_profile( T, long-term )
    Analyze the behavior of the entity by comparing its current behavior RT
    to its past behavior LT:
    For each datapoint DP in the profile,
        Compare the current value in RT to the one in LT (by computing the
        ratio or distance between the values).
            If the ratio or distance is greater than the pre-defined threshold,
            Then increase the risk associated to the transaction T
            Else decrease the risk associated to the transaction T
    End For
    Return the global risk associated to the transaction T
End
```

The entity's behavior in the instant transaction can further be analyzed to determine if its real-time (RT) behavior is out of the norm compared to its peer groups. If a threshold (T) is exceeded, the transaction risk score is incremented.

Recursive profiling compares the transaction (T) to the entity's peers one at a time.

```
compare_entity_to_peers( T: transaction)
Begin
    Get the real-time profile RTe by calling compute_profile (T, real-time)
    Get the long-term profile LTe by calling compute_profile (T, long-term )
    Analyze the behavior of the entity by comparing it to its peer groups:
    For each peer group associated to the entity
        Get the real-time profile RTp of the peer: compute_profile (T,
        real-time)
        Get the long-term profile LTp of the peer: compute_profile( T,
        long-term)
        For each datapoint DP in the profile,
        Compare the current value in RTe and LTe to the ones in RTp and
        LTp (by computing the ratio or distance between the values).
            If the ratio or distance is greater than the pre-defined threshold,
            Then increase the risk associated to the transaction T
            Else decrease the risk associated to the transaction T
        End For
    End For
    Return the global risk associated to the transaction T
End
```

Each attribute inspection will either increase or decrease the associated overall transaction risk. For example, a transaction with a zipcode that is highly represented in the long term profile would reduce risk. A transaction amount in line with prior experiences would also be a reason to reduce risk. But an MCC datapoint that has never been seen before for this entity represents a high risk. (Unless it could be forecast or otherwise predicted.)

One or more datapoints in a transaction can be expanded with a velocity count of how-many or how-much of the corresponding attributes have occurred over at least one different span of time intervals. The velocity counts are included in a calculation of the transaction risk.

Transaction risk is calculated datapoint-by-datapoint and includes velocity count expansions. The datapoint values that exceed a normative point by a threshold value increment the transaction risk. Datapoint values that do not exceed the threshold value cause the transaction risk to be decremented. A positive or negative bias value can be added that effectively shifts the threshold values to sensitize or desensitize a particular datapoint for subsequent transactions related to the same entity. For example, when an airline expense is certain to be followed by a rental car or hotel expense in a far away city. The MCC's for rental car and hotel expenses are desensitized, as are datapoints for merchant locations in a corresponding far away city.

Figure 11:
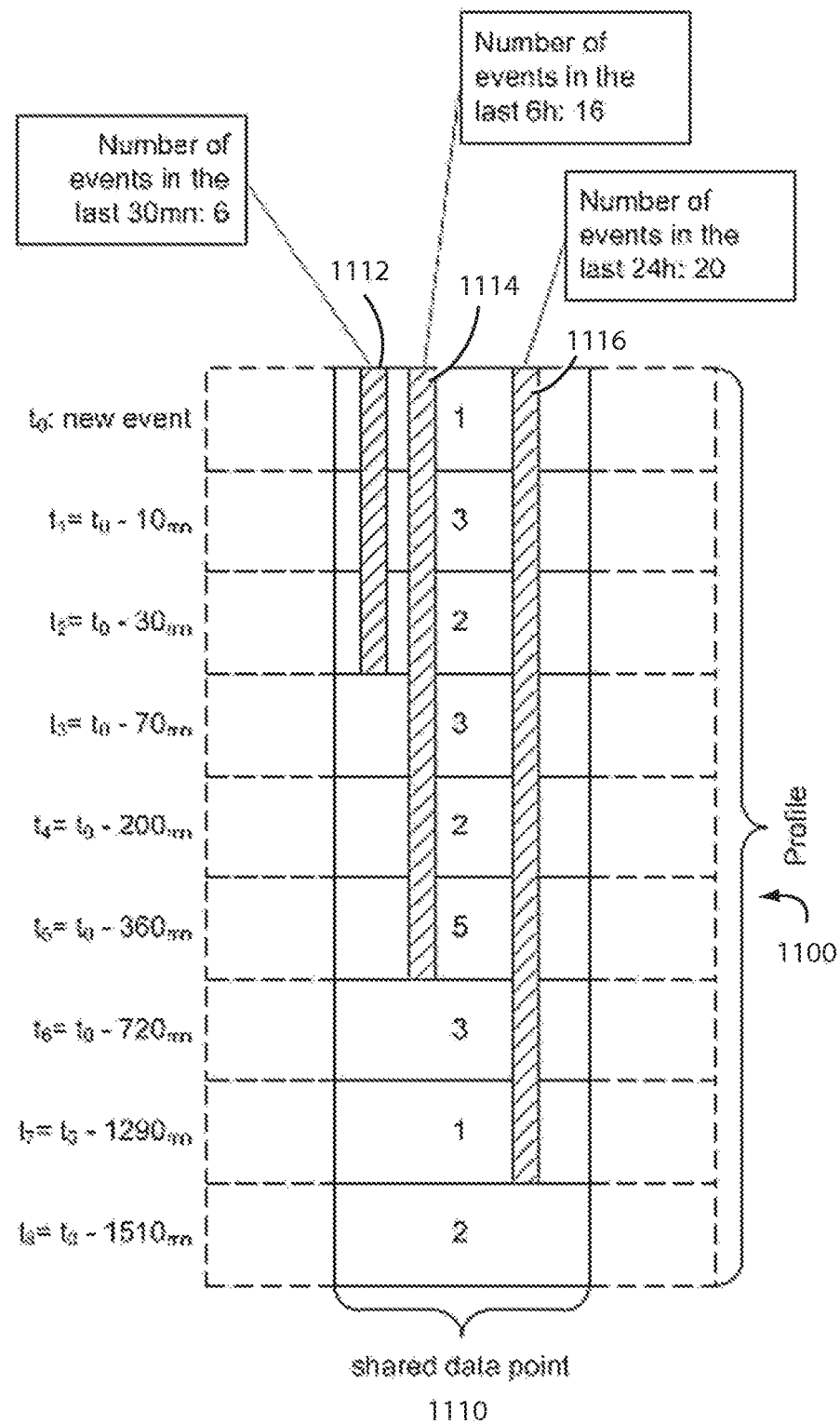
FIG. 11 is a diagram of a piece of an exemplary profile that spans several time intervals.

FIG. 11 illustrates an example of a profile 1100 that spans a number of time intervals $t_0$ to $t_8$. Transactions, and therefore profiles normally have dozens of datapoints that either come directly from each transaction or that are computed from transactions for a single entity over a series of time intervals. A typical datapoint 1110 velocity counts the number of events that have occurred in the last thirty minutes (count 1112), the last six hours (count 1114), and the last twenty-four hours (count 1116). In this example, $t_o$ had one event, $t_1$ had 3 events, $t_2$ had 2 events, $t_3$ had 3 events, $t_4$ had 2 events, $t_5$ had 5 events, $t_6$ had 3 events, $t_7$ had one event, and to had 2 events; therefore, $t_2$ count 1112=6, $t_5$ count 1114=16, and $t_7$ count 1116=20. These three counts, 1112-1116 provide their velocity count computations in a simple and quick-to-fetch summation.

Figure 12:
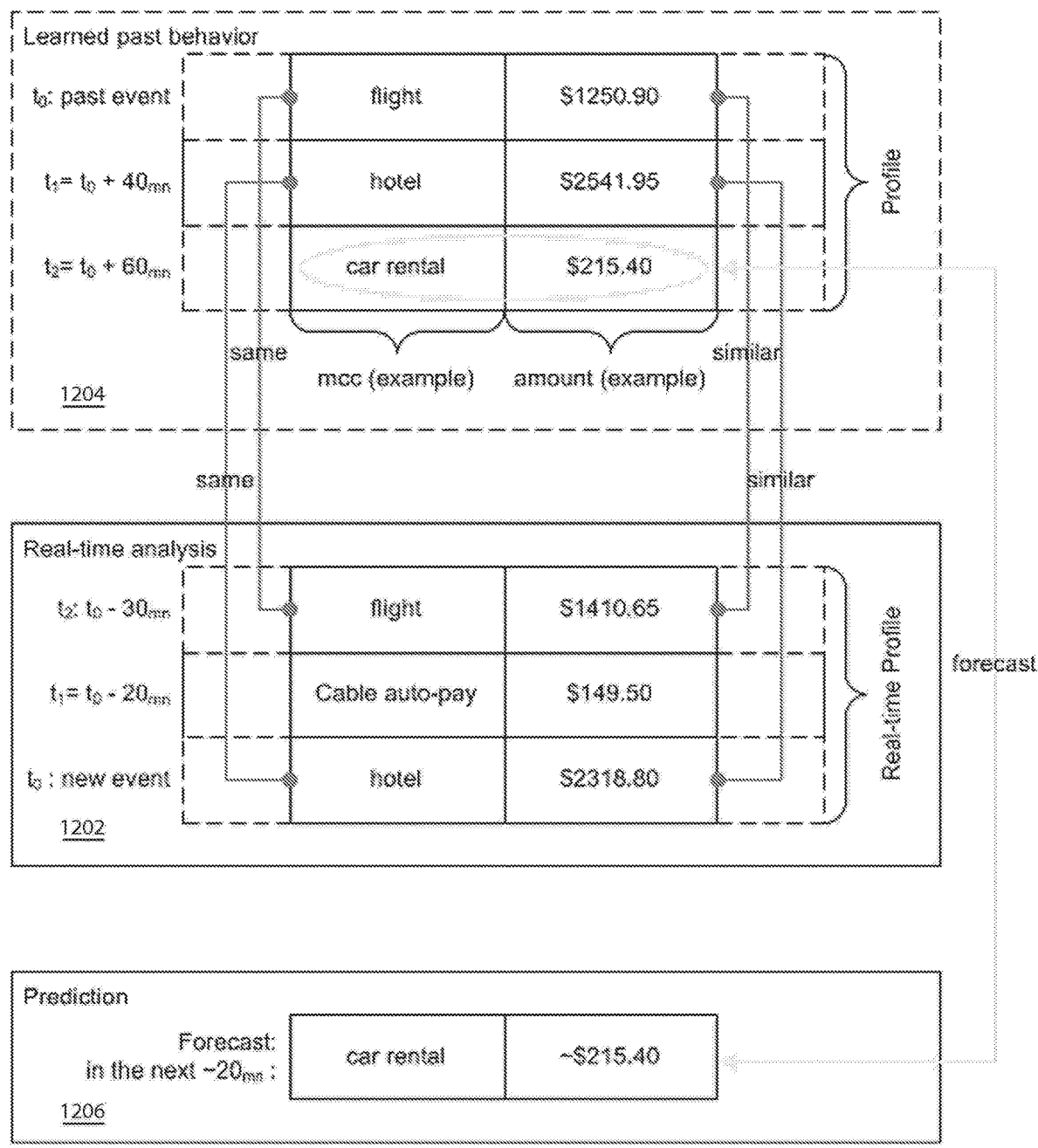
FIG. 12 is a diagram of a behavioral forecasting aspect of the present invention.

FIG. 12 illustrates a behavioral forecasting aspect of the present invention. A forecast model 1200 engages in a real-time analysis 1202, consults a learned past behavior 1204, and then makes a behavioral prediction 1206. For example, the real-time analysis 1202 includes a flight purchase for $1410.65, an auto pay for cable for $149.50, and a hotel for $2318.80 in a most recent event. It makes sense that the booking and payment for a flight would be concomitant with a hotel expense, as both represent travel. Consulting the learned past behavior 1204 reveals that transactions for flights and hotels have also been accompanied by a car rental. Forecasting a car rental in the near future is and easy and reasonable assumption to make in behavioral prediction 1206.

Normally, an out-of-character expense for a car rental would carry a certain base level of risk. But if it can be forecast that one is coming, and it arrives, then the risk can be reduced since it has been forecast and is expected. Embodiments of the present invention therefore temporarily reduce risk assessments in the future transactions whenever particular classes and categories of expenses can be predicted or forecast.

In another example, a transaction to pay tuition at a local college could be expected to result in related expenses. Forecasts for bookstore purchases and ATM cash withdrawals at the college are reasonable. The bottom-line is that fewer false positives will result.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A computer-implemented method for real-time transaction fraud vetting, comprising:
   receiving, at one or more processors, a transaction record that includes real-time transaction data relating to a transaction of an accountholder;
   matching, via the one or more processors, the transaction record to an applied fraud model that includes
      a plurality of long-term profiles of the accountholder that correspond respectively to a plurality of attributes of transaction behavior of the accountholder, each of the plurality of long-term profiles defining one or more normal values for each of the plurality of attributes computed from historical transaction records of the accountholder, and
      an artificial intelligence classifier that is constructed according to at least one of: a neural network, case-based reasoning, a decision tree, a genetic algorithm, fuzzy logic, and rules and constraints, the artificial intelligence classifier being trained to flag fraudulent activity based on historical transaction data of a plurality of accountholders;
   culling, via the one or more processors, the real-time transaction data to remove less relevant data and produce culled real-time transaction data;
   incrementing, via the one or more processors, a transaction risk for each instance in which the transaction record reflects a real-time deviation from the one or more normal values of one of the plurality of long-term profiles that exceeds a corresponding threshold;
   inputting, via the one or more processors, the culled real-time transaction data to the artificial intelligence classifier to generate an exception, the culled real-time transaction data being input to the artificial intelligence classifier in real-time and in parallel with the incrementing of the transaction risk;
   outputting, via the one or more processors, a fraud likelihood determination from the applied fraud model in real-time based at least in part on the incremented transaction risk and the exception; and
   updating, via the one or more processors, the plurality of long-term profiles based on the transaction record to generate an updated plurality of long-term profiles for the accountholder.

2. The computer-implemented method of claim 1, further comprising decrementing, via the one or more processors, the transaction risk corresponding to the transaction record for each instance in which real-time deviation of the transaction record from the one or more normal values of one of the plurality of long-term profiles does not exceed the corresponding threshold.

3. The computer-implemented method of claim 2, wherein incrementing the transaction risk based on one of the plurality of long-term profiles includes updating a corresponding real-time profile based on the transaction record and comparing the real-time profile against the long-term profile to determine the deviation.

4. The computer-implemented method of claim 1, further comprising
   receiving, at the one or more processors, a second transaction record including second real-time transaction data relating to a second transaction of the accountholder;
   matching, via the one or more processors, the second transaction record to an updated applied fraud model of the accountholder that includes the updated plurality of long-term profiles and the artificial intelligence classifier;
   culling, via the one or more processors, the second real-time transaction data to remove less relevant data and produce second culled real-time transaction data;
   incrementing, via the one or more processors, a second transaction risk for each instance in which the second transaction record reflects a real-time deviation from the one or more normal values of one of the updated plurality of long-term profiles that exceeds the corresponding threshold;
   inputting, via the one or more processors, the second culled real-time transaction data to the artificial intelligence classifier to generate a second exception, the second culled real-time transaction data being input to the artificial intelligence classifier in real-time and in parallel with the incrementing of the second transaction risk;
   outputting, via the one or more processors, a second fraud likelihood determination from the updated applied fraud model in real-time based at least in part on the second incremented transaction risk and the second exception; and
   updating, via the one or more processors, the updated plurality of long-term profiles based on the second transaction record to generate a twice updated plurality of long-term profiles for the accountholder.

5. The computer-implemented method of claim 1, further comprising feeding, via a bus configured to receive transaction records and feed corresponding transaction data to fraud models in real-time and in parallel, the culled real-time transaction data to the applied fraud model and second culled real-time transaction data to a second applied fraud model, wherein
   the applied fraud model is a first applied fraud model that corresponds to a first transactional channel and the artificial intelligence classifier is a first artificial intelligence classifier trained to flag fraudulent activity based on historical transaction data within the first transactional channel,
   the transaction record is a first transaction record relating to a first transaction occurring in the first transactional channel,
   the second culled real-time transaction data is generated from a second transaction record relating to a second transaction occurring in a second transactional channel,
   the second applied fraud model corresponds to the second transactional channel and includes a second artificial intelligence classifier trained to flag fraudulent activity based on historical transaction data within the second transactional channel.

6. The computer-implemented method of claim 5, further comprising adjusting, via the one or more processors, a second threshold of the second applied fraud model based on the incremented transaction risk from the first applied fraud model.

7. The computer-implemented method of claim 5, further comprising
   incrementing, via the one or more processors, the incremented transaction risk in real-time at least in part by implementing a velocity vector pointing to a rolling list of a long-term profile of the second applied fraud model to determine whether the second transaction record causes the rolling list to exceed a second threshold.

8. The computer-implemented method of claim 1, wherein
the exception of the artificial intelligence classifier includes an independently computed supplemental fraud score,
the transaction risk comprises a risk fraud score,
the fraud likelihood determination is made at least in part by computing, via the one or more processors, a final fraud score using a weighted summation of the supplemental fraud score and the risk fraud score.

9. The computer-implemented method of claim 8, wherein computing the final fraud score includes retrieving one or more user-tuned weighting adjustments and incorporating the weighting adjustments into the weighted summation.

10. A monitoring payment network server for real-time transaction fraud vetting, comprising:
one or more processors;
a bus configured to feed at least parts of transaction records in parallel line-by-line to one or more applied fraud channel models; and
a non-transitory computer-readable storage media having computer-executable instructions stored thereon, wherein when executed by the one or more processors the computer-readable instructions cause the one or more processors to
receive a transaction record that includes real-time transaction data relating to a transaction of an accountholder;
match the transaction record to an applied fraud model that includes
a plurality of long-term profiles of the accountholder that correspond respectively to a plurality of attributes of transaction behavior of the accountholder, each of the plurality of long-term profiles defining one or more normal values for each of the plurality of attributes computed from historical transaction records of the accountholder, and
an artificial intelligence classifier that is constructed according to at least one of: a neural network, case-based reasoning, a decision tree, a genetic algorithm, fuzzy logic, and rules and constraints, the artificial intelligence classifier being trained to flag fraudulent activity based on historical transaction data of a plurality of accountholders;
cull the real-time transaction data to remove less relevant data and produce culled real-time transaction data;
increment a transaction risk for each instance in which the transaction record reflects a real-time deviation from the one or more normal values of one of the plurality of long-term profiles that exceeds a corresponding threshold;
input the culled real-time transaction data to the artificial intelligence classifier to generate an exception, the culled real-time transaction data being input to the artificial intelligence classifier in real-time and in parallel with the incrementing of the transaction risk;
output a fraud likelihood determination from the applied fraud model in real-time based at least in part on the incremented transaction risk and the exception; and
update the plurality of long-term profiles based on the transaction record to generate an updated plurality of long-term profiles for the accountholder.

11. The monitoring payment network server of claim 10, wherein the computer-executable instructions further cause the at least one processor to decrement the transaction risk corresponding to the transaction record for each instance in which real-time deviation of the transaction record from the one or more normal values of one of the plurality of long-term profiles does not exceed the corresponding threshold.

12. The monitoring payment network server of claim 11, wherein incrementing the transaction risk based on one of the plurality of long-term profiles includes updating a corresponding real-time profile based on the transaction record and comparing the real-time profile against the long-term profile to determine the deviation.

13. The monitoring payment network server of claim 10, wherein the computer-executable instructions further cause the at least one processor to
receive a second transaction record including second real-time transaction data relating to a second transaction of the accountholder;
match the second transaction record to an updated applied fraud model of the accountholder that includes the updated plurality of long-term profiles and the artificial intelligence classifier;
cull the second real-time transaction data to remove less relevant data and produce second culled real-time transaction data;
increment a second transaction risk for each instance in which the second transaction record reflects a real-time deviation from the one or more normal values of one of the updated plurality of long-term profiles that exceeds the corresponding threshold;
input the second culled real-time transaction data to the artificial intelligence classifier to generate a second exception, the second culled real-time transaction data being input to the artificial intelligence classifier in real-time and in parallel with the incrementing of the second transaction risk;
output a second fraud likelihood determination from the updated applied fraud model in real-time based at least in part on the second incremented transaction risk and the second exception;
update the updated plurality of long-term profiles based on the second transaction record to generate a twice updated plurality of long-term profiles for the accountholder.

14. The monitoring payment network server of claim 10, wherein the computer-executable instructions further cause the at least one processor to
feed, via a bus configured to receive transaction records and feed corresponding transaction data to fraud models in real-time and in parallel, the culled real-time transaction data to the applied fraud model and second culled real-time transaction data to a second applied fraud model, wherein
the applied fraud model is a first applied fraud model that corresponds to a first transactional channel and the artificial intelligence classifier is a first artificial intelligence classifier trained to flag fraudulent activity based on historical transaction data within the first transactional channel,
the transaction record is a first transaction record relating to a first transaction occurring in the first transactional channel, the second culled real-time transaction data is generated from a second transaction record relating to a second transaction occurring in a second transactional channel, the second applied fraud model corresponds to the second transactional channel and includes a second artificial intelligence classifier trained to flag fraudulent activity based on historical transaction data within the second transactional channel.

15. The monitoring payment network server of claim 14, wherein the computer-executable instructions further cause the at least one processor to adjust a second threshold of the second applied fraud model based on the incremented transaction risk from the first applied fraud model.

16. The monitoring payment network server of claim 14, wherein the computer-executable instructions further cause the at least one processor to increment the incremented transaction risk in real-time at least in part by implementing a velocity vector pointing to a rolling list of a long-term profile of the second applied fraud model to determine whether the second transaction record causes the rolling list to exceed a second threshold.

17. The monitoring payment network server of claim 10, wherein the exception of the artificial intelligence classifier includes an independently computed supplemental fraud score, the transaction risk comprises a risk fraud score, the fraud likelihood determination is made at least in part by computing a final fraud score using a weighted summation of the supplemental fraud score and the risk fraud score.

18. The monitoring payment network server of claim 17, wherein computing the final fraud score includes retrieving one or more user-tuned weighting adjustments and incorporating the weighting adjustments into the weighted summation.

19. Non-transitory computer-readable storage media having computer-executable instructions for real-time transaction fraud vetting, wherein when executed by at least one processor the computer-readable instructions cause the at least one processor to:

receive a transaction record that includes real-time transaction data relating to a transaction of an accountholder;

match the transaction record to an applied fraud model that includes a plurality of long-term profiles of the accountholder that correspond respectively to a plurality of attributes of transaction behavior of the accountholder, each of the plurality of long-term profiles defining one or more normal values for each of the plurality of attributes computed from historical transaction records of the accountholder, and an artificial intelligence classifier that is constructed according to at least one of: a neural network, case-based reasoning, a decision tree, a genetic algorithm, fuzzy logic, and rules and constraints, the artificial intelligence classifier being trained to flag fraudulent activity based on historical transaction data of a plurality of accountholders;

cull the real-time transaction data to remove less relevant data and produce culled real-time transaction data;

increment a transaction risk for each instance in which the transaction record reflects a real-time deviation from the one or more normal values of one of the plurality of long-term profiles that exceeds a corresponding threshold;

input the culled real-time transaction data to the artificial intelligence classifier to generate an exception, the culled real-time transaction data being input to the artificial intelligence classifier in real-time and in parallel with the incrementing of the transaction risk;

output a fraud likelihood determination from the applied fraud model in real-time based at least in part on the incremented transaction risk and the exception; and update the plurality of long-term profiles based on the transaction record to generate an updated plurality of long-term profiles for the accountholder.

20. The computer-readable storage media of claim 19, wherein, when executed by the at least one processor, the computer-readable instructions further cause the at least one processor to decrement the transaction risk corresponding to the transaction record for each instance in which real-time deviation of the transaction record from the one or more normal values of one of the plurality of long-term profiles does not exceed the corresponding threshold.

* * * * *